(12) United States Patent
Yang et al.

(10) Patent No.: US 12,488,854 B2
(45) Date of Patent: Dec. 2, 2025

(54) DATA STORAGE DEVICE AND METHOD FOR HOST-MANAGED DATA INTEGRITY

(71) Applicant: Western Digital Technologies, Inc., San Jose, CA (US)

(72) Inventors: Niles Yang, Mountain View, CA (US); Judah Gamliel Hahn, Ofra (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/226,370

(22) Filed: Jul. 26, 2023

(65) Prior Publication Data
US 2024/0420791 A1 Dec. 19, 2024

Related U.S. Application Data

(60) Provisional application No. 63/472,997, filed on Jun. 14, 2023.

(51) Int. Cl.
*G11C 29/44* (2006.01)
*G06F 16/23* (2019.01)

(52) U.S. Cl.
CPC .......... *G11C 29/44* (2013.01); *G06F 16/2365* (2019.01)

(58) Field of Classification Search
CPC .............................. G11C 29/44; G06F 16/2365
USPC .................................................. 714/719, 763
See application file for complete search history.

(56) References Cited

U.S. PATENT DOCUMENTS

| | | | |
|---|---|---|---|
| 7,254,765 B2 | 8/2007 | Meyer et al. | |
| 8,161,334 B1* | 4/2012 | Hulbert | G11C 29/76 714/764 |
| 8,479,077 B2 | 7/2013 | Lee et al. | |
| 9,009,576 B1* | 4/2015 | Jeon | G06F 11/1068 714/780 |
| 9,430,329 B2 | 8/2016 | Trantham | |
| 10,348,337 B2* | 7/2019 | Lien | H03M 13/3715 |
| 10,990,294 B2 | 4/2021 | Hahn et al. | |
| 2009/0106626 A1 | 4/2009 | Hou et al. | |
| 2010/0332894 A1* | 12/2010 | Bowers | G06F 11/1008 714/E11.042 |
| 2010/0332895 A1* | 12/2010 | Billing | G11C 16/349 711/108 |
| 2010/0332950 A1* | 12/2010 | Billing | G06F 11/1008 711/E12.007 |
| 2011/0111805 A1* | 5/2011 | Paquier | G10L 13/00 455/563 |
| 2018/0013451 A1* | 1/2018 | Kaynak | G11C 29/52 |

(Continued)

*Primary Examiner* — Albert Decady
*Assistant Examiner* — Osman M Alshack
(74) *Attorney, Agent, or Firm* — Crowell & Moring LLP

(57) ABSTRACT

In one embodiment, a data storage device is provided comprising a memory and a controller. The controller is configured to: receive, from a host, a command to read data from the memory, wherein the command comprises a data integrity level threshold; read the data from the memory; determine a data integrity level of the data; in response to the data integrity level of the data being above the threshold, send the data to the host; and in response to the data integrity level of the data not being above the threshold: perform at least one iteration of an error correction operation on the data until the data integrity level of the data is above the threshold; and send the data to the host. Other embodiments are provided, and each of the embodiments can be used alone or in combination.

20 Claims, 5 Drawing Sheets

(56) References Cited

U.S. PATENT DOCUMENTS

| | | | | |
|---|---|---|---|---|
| 2020/0252079 A1* | 8/2020 | Wang | ................. | H03M 13/1128 |
| 2020/0349080 A1* | 11/2020 | Radi | ................... | G06F 12/0822 |
| 2021/0036716 A1* | 2/2021 | Zhang | ................. | G06F 11/1012 |
| 2021/0273653 A1* | 9/2021 | Gad | ................... | H03M 13/1111 |
| 2021/0342095 A1* | 11/2021 | Avraham | .......... | H03M 13/3723 |
| 2021/0349778 A1* | 11/2021 | Sharon | ............... | H03M 13/1111 |
| 2022/0083261 A1* | 3/2022 | Fujiwara | ............... | G06F 3/0679 |
| 2022/0156143 A1* | 5/2022 | Zamir | ................ | G06F 13/1668 |

\* cited by examiner

DATA STORAGE DEVICE AND METHOD FOR HOST-MANAGED DATA INTEGRITY

CROSS-REFERENCE TO RELATED APPLICATION

This application claims priority to U.S. provisional patent application No. 63/472,997, filed Jun. 14, 2023, which is hereby incorporated by reference.

BACKGROUND

A host can store and read data from a memory in a data storage device. Data integrity is often managed by the data storage device by using a program error handling algorithm during a write operation and an error correction algorithm during a read operation. However, these operations take time and resources. For example, in case of a read error, a read-retry command can be issued to re-sense the memory for further decoding (e.g., a soft bit read), which can take time and negatively impact the quality of service and performance of the data storage device. Similarly, excess program time and program failure handling can also negatively impact the quality of service for both write and read operations in case of a mixed host workload.

DETAILED DESCRIPTION

Figure 1A:
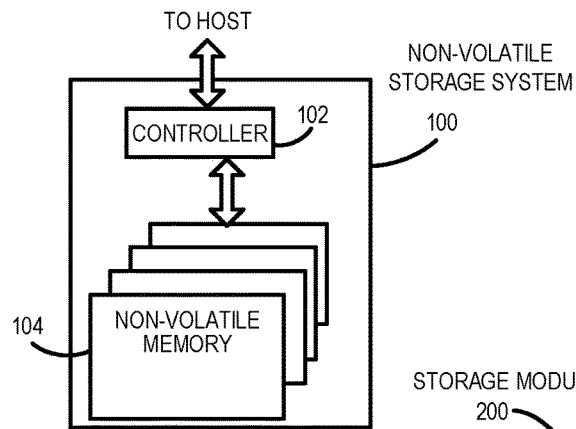
FIG. 1A is a block diagram of a data storage device of an embodiment.

The following embodiments generally relate to a data storage device and method for host-managed data integrity. In one embodiment, a data storage device is provided comprising a memory and a controller. The controller is configured to: receive, from a host, a command to read data from the memory, wherein the command comprises a data integrity level threshold; read the data from the memory; determine a data integrity level of the data; in response to the data integrity level of the data being above the threshold, send the data to the host; and in response to the data integrity level of the data not being above the threshold: perform at least one iteration of an error correction operation on the data until the data integrity level of the data is above the threshold; and send the data to the host.

In some embodiments, the data integrity level of the data is indicated by a syndrome weight.

In some embodiments, the data integrity level threshold is indicated by a bit error rate.

In some embodiments, the controller is further configured to perform a read scrub operation on the data stored in the memory after the data is send to the host.

In some embodiments, the controller is further configured to receive, from the host, a second command to read data from the memory, wherein the second command comprises a higher data integrity level threshold than the data integrity level threshold in the command.

In some embodiments, the command is received from the host via a customized protocol.

In some embodiments, the data integrity level is based on data type, a customer need, a performance need, and/or a quality of service need.

In some embodiments, the data comprises a video.

In some embodiments, the data comprises an audio recording with a noise level above a threshold.

In some embodiments, the controller is further configured to write the data to the memory according to a write error tolerance received from the host.

In some embodiments, the controller is further configured to tune at least one of the following to ensure the data is written to the memory according to the write error tolerance received from the host: a memory parameter, a write speed, a parity, or a bit-ignore value.

In some embodiments, the memory comprises a three-dimensional memory array.

In another embodiment, a method is provided that is performed in a data storage device comprising a memory. The method comprises: receiving a read command from a host, wherein the read command specifies a target bit error rate; reading the data from the memory; determining a bit error rate of the data read from the memory; and performing one of: in response to the bit error rate of the data meeting the target bit error rate, returning the data to the host; and in response to the bit error rate of the data not meeting the target bit error rate, performing iteration(s) of error correction until the bit error rate of the data meets the target bit error rate, after which the data is returned to the host.

In some embodiments, the method further comprises performing a read scrub operation on the data stored in the memory after the data is returned to the host.

In some embodiments, the method further comprises receiving, from the host, a second read command comprises a higher bit error rate than the higher bit error rate in the read command.

In some embodiments, the read command is received from the host via a customized protocol.

In some embodiments, the target bit error rate is based on data type, a customer need, a performance need, and/or a quality of service need.

In some embodiments, the method further comprises the data comprises a video.

In some embodiments, the data comprises an audio recording with a noise level above a threshold.

In another embodiment, a data storage device is provided comprising: a memory; means for determining whether data read from the memory satisfies a data integrity level threshold specified by a host; means for sending the data to the host in response to the data integrity level threshold being satisfied; and means for performing one or more iterations of error correction until the data integrity level threshold is satisfied.

Other embodiments are possible, and each of the embodiments can be used alone or together in combination. Accordingly, various embodiments will now be described with reference to the attached drawings.

EMBODIMENTS

The following embodiments relate to a data storage device (DSD). As used herein, a "data storage device" refers to a device that stores data. Examples of DSDs include, but are not limited to, NAND flash memory devices (e.g., according to the Universal File System (UFS) specification), hard disk drives (HDDs), solid state drives (SSDs), tape drives, hybrid drives, etc. Details of example DSDs are provided below.

Figure 1B:
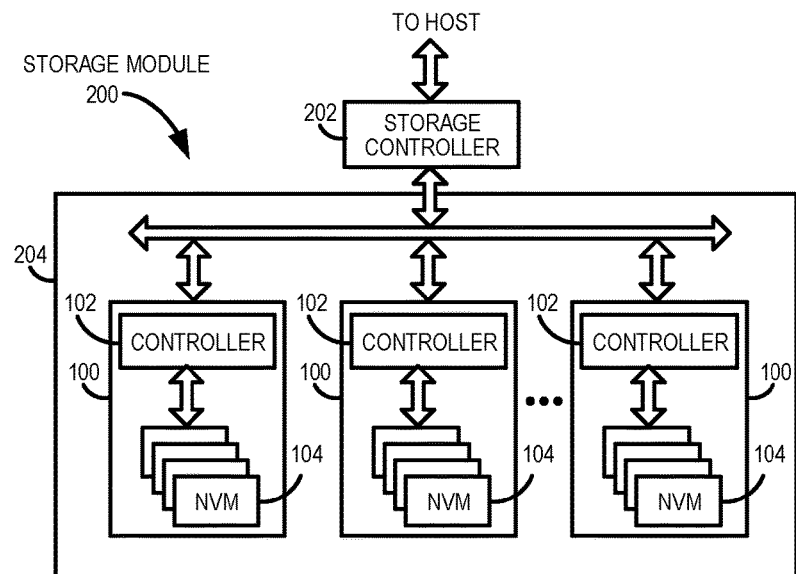
FIG. 1B is a block diagram illustrating a storage module of an embodiment.
Figure 1C:
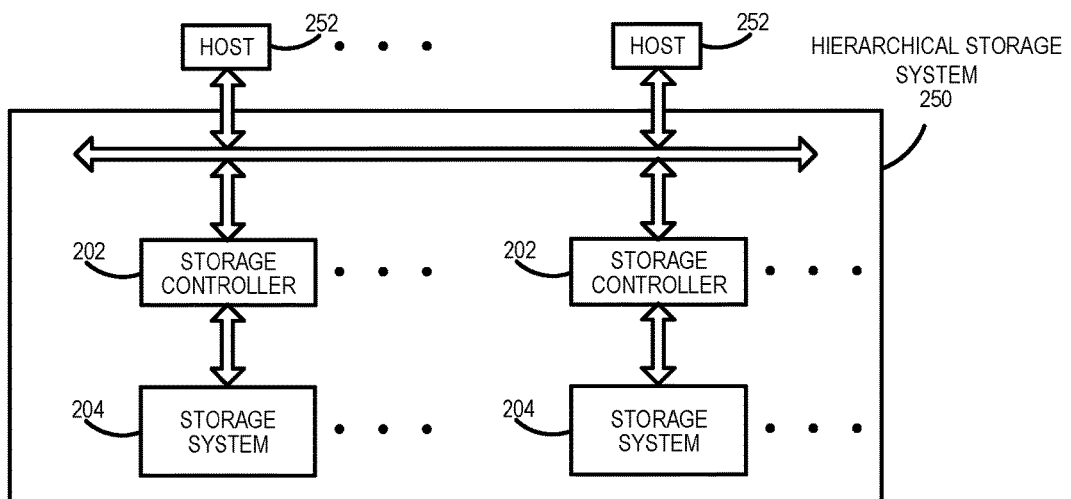
FIG. 1C is a block diagram illustrating a hierarchical storage system of an embodiment.

Data storage devices suitable for use in implementing aspects of these embodiments are shown in FIGS. 1A-1C. FIG. 1A is a block diagram illustrating a data storage device 100 according to an embodiment of the subject matter described herein. Referring to FIG. 1A, data storage device 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card-based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
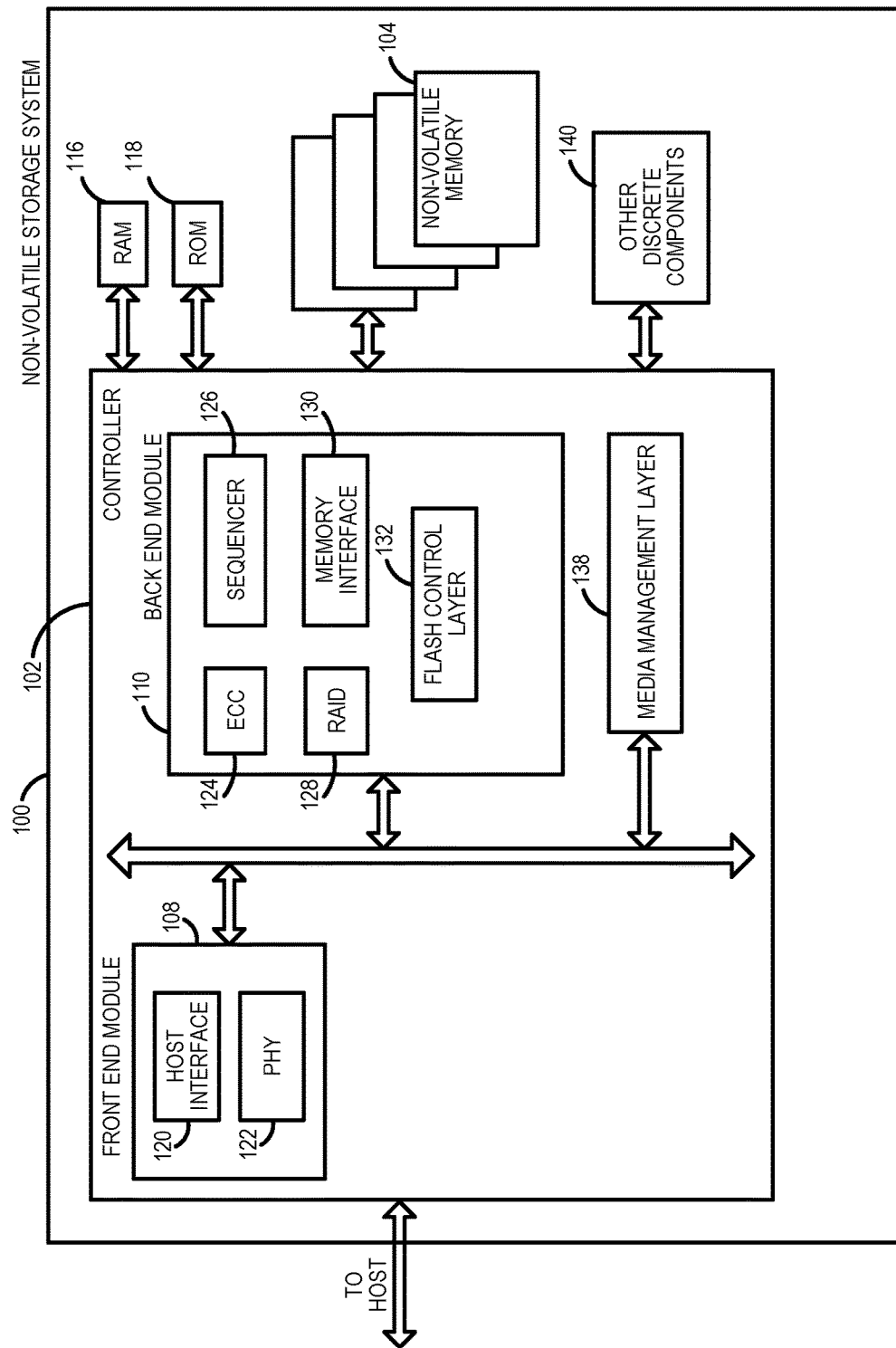
FIG. 2A is a block diagram illustrating components of the controller of the data storage device illustrated in FIG. 1A according to an embodiment.

FIG. 2A is a block diagram illustrating components of controller 102 in more detail. Controller 102 includes a front-end module 108 that interfaces with a host, a back-end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Also, "means" for performing a function can be implemented with at least any of the structure noted herein for the controller and can be pure hardware or a combination of hardware and computer-readable program code.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
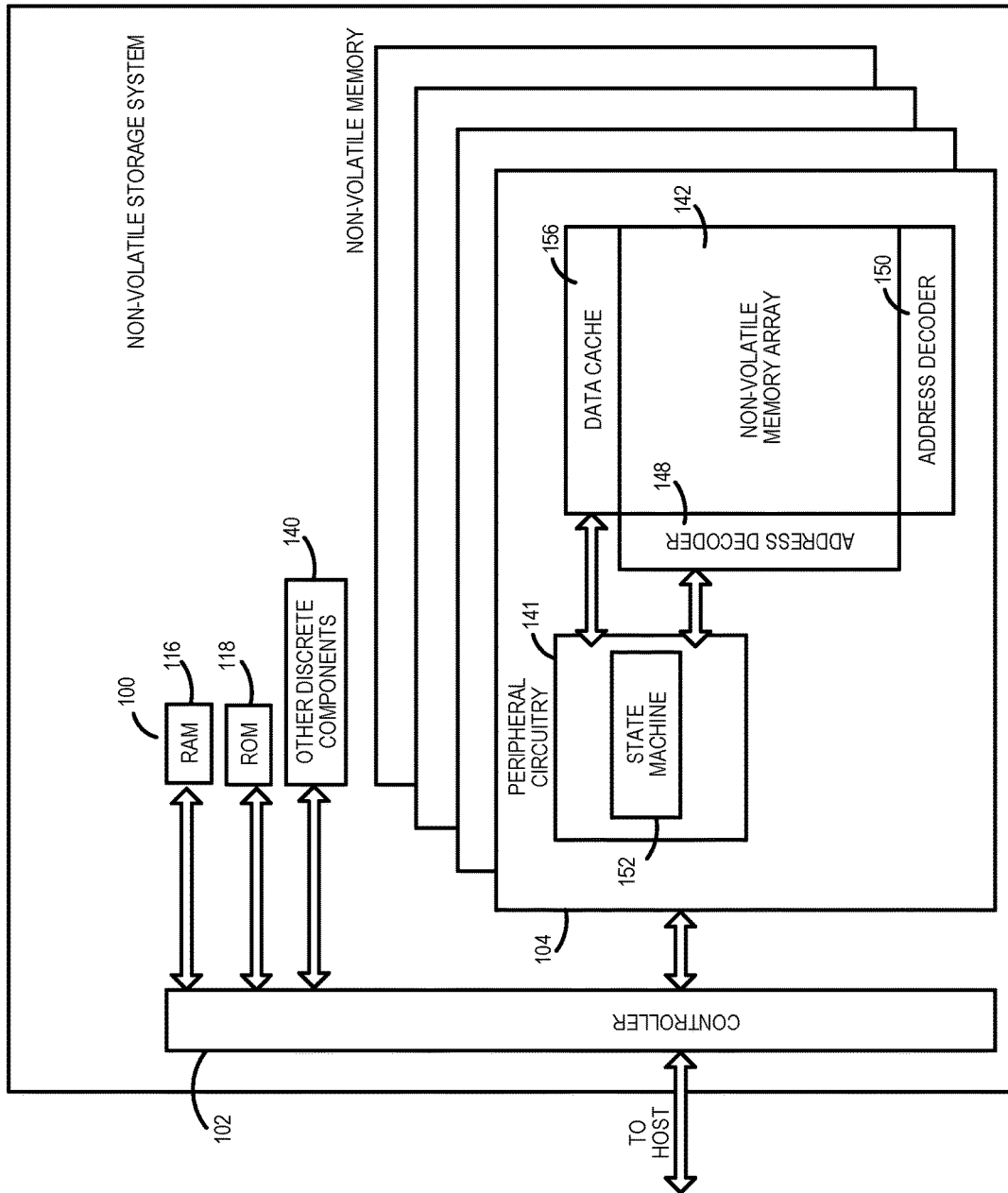
FIG. 2B is a block diagram illustrating components of the memory data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
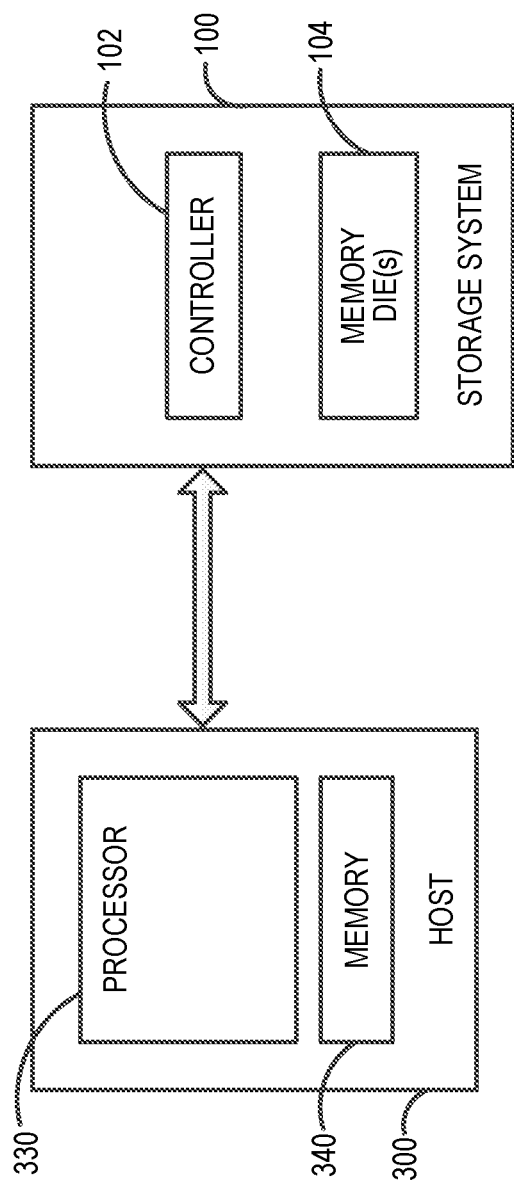
FIG. 3 is a block diagram of a host and data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises a processor 330 and a memory 340. In one embodiment, computer-readable program code stored in the host memory 340 configures the host processor 330 to perform the acts described herein. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

As mentioned above, a host can store and read data from a memory in a data storage device. Data integrity is often managed by the data storage device by using a program error handling algorithm during a write operation and an error correction algorithm during a read operation. However, these operations take time and resources. For example, in case of a read error, a read-retry command can be issued to re-sense the memory for further decoding (e.g., a soft bit read), which can take time and negatively impact the quality of service and performance of the data storage device. Similarly, excess program time and program failure handling can negatively impact the quality of service for both write and read operations in the case of a mixed host workload.

Some types of data (e.g., short videos or audio recordings of events with a lot of background noise, such as a baseball game) can require quick quality of service in order for a service to provide a user with "live" data (e.g., in real time or near real time). As such, the data needs to be transferred and written to the memory 104 of the data storage device 100 as soon as possible. The data also needs to be able to be read from the memory 104 of the data storage device 100 as soon as possible. Also, the quality of the data may not need to be at the highest quality level, as the data is usually short-lived and deleted/modified/replaced/obsolete after a short amount of time (but the data can be made available while it is still useful at a certain time).

The following embodiments can be used to provide a new communication protocol between the host 300 and the data storage device 100 in these types of situations to determine what data quality is minimally needed to ensure quality of service and performance with a certain level of compromise in quality. In general, with these embodiments, the host 300 determines the level of data integrity for the data to be read from the data storage device 100. This can be done using a percentage of an allowable bit error rate for the data (e.g., 0%, <1%, <2%, etc.). This information can be part of a customized protocol for a user command issued to the data storage device 100 from the host 300 (e.g., this can be a new protocol on top of the NVMe command set).

In response to receiving this command from the host 300, the data storage device 100 can specify the logical block address (LBA) to be treated for the "integrity level." During a read command, the controller 102 can convert the LBA to a physical block address (PBA) in the memory 104 using a logical-to-physical address map and then sense the data at the PBA. The sensed data is sent to the ECC engine 124 (e.g., a low-density parity check (LDPC) engine) in the controller 102. The ECC engine 124 can conduct a quick syndrome weight (SW) estimation without decoding the data read from the memory 104 (e.g., without performing a full error correction operation to identify and possibly correct errors). In general, syndrome weight refers to the state of error correction (e.g., LDPC) at any given iteration during a decoding operation (e.g., indicates the number of remaining bit errors after a given iteration). For example, with LDPC, syndrome weight can indicate how many check nodes do not meet a required parity check and require further processing.

The controller 102 then compares this syndrome weight for that error correction iteration to a given BER provided by the host 300. If the syndrome weight is less than the BER provided by the host 300, the data will not be decoded and will be sent right away to the host 300 through subsequent data process units in the data storage device 100. Data integrity in this case may not be ideal, but the quality of service is faster. In contrast, if the syndrome weight is greater than the BER provided by the host 300, the controller 102 does another iteration of decoding and error correction. The resulting data is then estimated again for its syndrome weight. Once the syndrome weight is less than the BER provided be the host 300, the data is sent to the host 300 without further action. Normal read error handling (REH) can then be called upon in this loop. In the background, if the controller 102 realizes that the syndrome weight is greater than an internal read scrub threshold, the read scrub can take place at a higher priority in case this data is to be read again in near future by the host 300.

When the host 300 receives the data from the data storage device 100, the host 300 can determine if the data is up to the user's quality requirement. If the data does not have the required quality, the host 300 can issue a re-read to the data storage device 100 with a lowered BER level for the data storage device 100 to provide improved data. Even in this situation, a faster read quality of service/performance can be achieved for this special data situation.

Turning now to a write operation, based on the host application and use tolerance, the host 300 can determine the error tolerance for the data written to the data storage device 100. For example, during write, the host 300 can mark which LBA ranges have a higher error tolerance and a short quality of service requirement. In other words, during a read operation, these LBA ranges are permitted to return errors but have a low latency. During read, a new mechanism can be added to indicate that the host 300 is still prepared (for the previously-marked ranges) to correct or ignore the errors. Various items (such as memory parameters, write speed, parity, etc.) can be tuned during write to minimize latency and eliminate preparation for error recovery, as well as selective or predetermined factors that allow the host 300 to accept a read with errors on specific LBA ranges. For example, "bit ignore" during a write can indicate that the bits that can be allowed to be erroneous for a program/erase, and it can be made more relaxed to speed up the program operation and avoid the program/erase failure that will take time, thereby improving quality of service. In another embodiment, the ECC information is returned to the host 300, so the host 300 can do the error correction itself.

Figure 4:
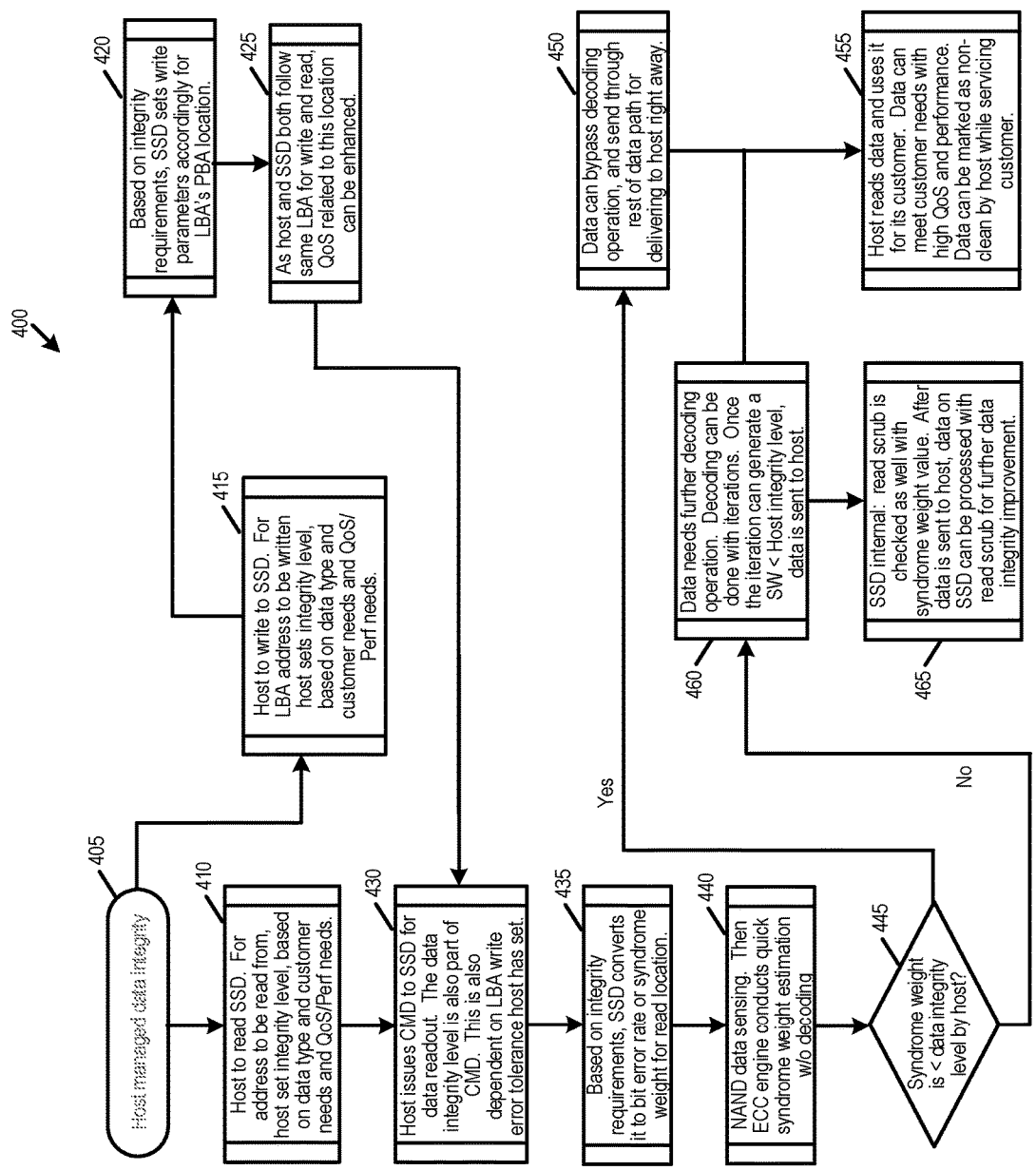
FIG. 4 is a flow chart of a method of an embodiment for host-managed data integrity.

Turning again to the drawings, FIG. 4 is a flow chart 400 of an example method of an embodiment. As shown in FIG. 4, the host managed data integrity process (act 405) has a read path and a write path. Turning first to the read path, the host 300 sets the integrity level of the logical address it wants to read (act 410). The integrity level can be based on, for example, data type, customer needs, and quality of service/performance needs. The host 300 then issues a read command to the data storage device 100, where the read command contains the integrity level (act 430). The controller 102 in the data storage device 100 then converts the integrity level to a bit error rate or syndrome weight for the read location (act 435). After the data is sensed from the memory 104, the ECC engine 124 conducts a quick syndrome weight estimation without decoding the data (act 440).

The controller 102 then determines if the syndrome weight is less than the data integrity level set by the host 300 (act 445). If the syndrome weight is less than the data integrity level set by the host 300, the data can bypass the decoding operation and be sent through the rest of the data path for quick delivery to the host 300 (act 450). However, if the syndrome weight is not less than the data integrity level set by the host 300, the data needs further decoding, which can be done in iterations (act 460). Once an iteration can generate a syndrome weight less than the host integrity level, the data is sent to the host 300. In any event, when the host 300 receives data from the data storage device 100, it can use the data to meet the customer's needs and mark the data as non-clean (act 455). Also, the data storage device 100 can perform a read scrub operation on the data for further data integrity improvement in the future (act 465).

There are several advantages associated with these embodiments. For example, these embodiments can be used to increase the performance and the quality of service of a data storage device. Also, these embodiments can reduce the bit error rate (BER) impact to the host/data storage device system without negatively impacting the user's experience. As another advantage, these embodiments can use a new command protocol (instead of existing command sequences) for the host error level tolerance. This can be predetermined by the host 300 based on the type of data it reads (such as a noisy ball game where people generate a short video/audio that is expected to be low quality). This also allows a single read operation to be performed instead of multiple read operations, which is advantageous as multiple reads can slow down the quality of service and performance which is not preferred for "quick-shot data," such as short live video/audio/notes. Also, with these embodiments, the host 300 can handle compressed data.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
a memory; and
a processor configured to communicate with the memory and further configured to:
receive, from a host, a command to read data from the memory, wherein the command comprises a data integrity level set by the host based on an amount of time after which the data will be obsolete;
read the data from the memory;
estimate a syndrome weight of the data read from the memory;
determine whether the syndrome weight is lower than the data integrity level set by the host;
in response to determining that the syndrome weight is lower than the data integrity level set by the host:
send the data to the host without performing an error correction operation on the data, which reduces read latency; and
receive, from the host, a request to re-read the data with a higher data integrity level in response to the data sent to the host not meeting a quality of service requirement; and
in response to determining that the syndrome weight is not lower than the data integrity level set by the host:
perform an error correction operation on the data until the syndrome weight is lower than the data integrity level set by the host; and
send error-corrected data to the host.

2. The data storage device of claim 1, wherein the processor is further configured to perform a read scrub operation on the data.

3. The data storage device of claim 1, wherein the data integrity level is received from the host via a customized protocol.

4. The data storage device of claim 1, wherein the data integrity level is also based on a customer need.

5. The data storage device of claim 1, wherein the type of the data comprises video.

6. The data storage device of claim 1, wherein the type of the data comprises audio with a noise level above a threshold.

7. The data storage device of claim 1, wherein the processor is further configured to write the data to the memory using a write parameter configured to reduce write latency.

8. The data storage device of claim 7, wherein the write parameter comprises a memory parameter.

9. The data storage device of claim 7, wherein the write parameter comprises a write speed.

10. The data storage device of claim 7, wherein the write parameter comprises a parity.

11. The data storage device of claim 7, wherein the write parameter comprises a bit-ignore value.

12. The data storage device of claim 1, wherein the memory comprises a three-dimensional memory array.

13. A method comprising:
performing in a data storage device comprising a memory:
receiving, from a host, a command to read data from the memory, wherein the command comprises a data integrity level set by the host based on an amount of time after which the data will be obsolete;
reading the data from the memory;
estimating a syndrome weight of the data read from the memory;
determining whether the syndrome weight is lower than the data integrity level set by the host; and
in response to determining that the syndrome weight is lower than the data integrity level set by the host:
sending the data to the host without performing an error correction operation on the data, which reduces read latency; and
receiving, from the host, a request to re-read the data with a higher data integrity level in response to the data sent to the host not meeting a quality of service requirement; and
in response to determining that the syndrome weight is not lower than the data integrity level set by the host:
performing an error correction operation on the data until the syndrome weight is lower than the data integrity level set by the host; and
sending error-corrected data to the host.

14. The method of claim 13, further comprising performing a read scrub operation on the data.

15. The method of claim 13, wherein the data integrity level is received from the host via a customized protocol.

16. The method of claim 13, wherein the data integrity level is also based on a customer need.

17. The method of claim 13, wherein the type of the data comprises video.

18. The method of claim 13, wherein the type of the data comprises audio with a noise level above a threshold.

19. The method of claim 13, wherein the data integrity level is also based on a performance need.

20. A data storage device comprising:
a memory; and
means for:
receiving, from a host, a command to read data from the memory, wherein the command comprises a data integrity level set by the host based on an amount of time after which the data will be obsolete;
reading the data from the memory;
estimating a syndrome weight of the data read from the memory;
determining whether the syndrome weight is lower than the data integrity level set by the host; and
in response to determining that the syndrome weight is lower than the data integrity level set by the host:
sending the data to the host without performing an error correction operation on the data, which reduces read latency; and receiving, from the host, a request to re-read the data with a higher data integrity level in response to the data sent to the host not meeting a quality of service requirement; and in response to determining that the syndrome weight is not lower than the data integrity level set by the host:
performing an error correction operation on the data until the syndrome weight is lower than the data integrity level set by the host; and
sending error-corrected data to the host.

* * * * *